United States Patent [19]

Lantier, Sr. et al.

[11] Patent Number: 5,320,181
[45] Date of Patent: Jun. 14, 1994

[54] COMBINATION CHECK VALVE & BACK PRESSURE VALVE

[75] Inventors: Mike Lantier, Sr., Scott; Warren L. Walmer, Sr., Youngsville, both of La.

[73] Assignee: Wellheads & Safety Control, Inc., Scott, La.

[21] Appl. No.: 952,794

[22] Filed: Sep. 28, 1992

[51] Int. Cl.$^5$ .............................................. E21B 34/00
[52] U.S. Cl. ...................................... 166/386; 166/325
[58] Field of Search ............... 166/381, 386, 387, 319, 166/320, 321, 325

[56] References Cited

U.S. PATENT DOCUMENTS

| | | | |
|---|---|---|---|
| 2,919,709 | 9/1960 | Schwegman | 166/325 X |
| 3,040,710 | 6/1962 | Wilder | 166/325 X |
| 3,051,246 | 8/1962 | Clark, Jr. et al. | 166/325 |
| 3,954,138 | 5/1976 | Miffre | 166/325 X |
| 4,645,006 | 2/1987 | Tinsley | 166/386 X |
| 4,646,844 | 3/1987 | Roche et al. | 166/386 X |

Primary Examiner—Thuy M. Bui
Attorney, Agent, or Firm—William D. Kiesel; C. Dean Domingue; Joseph N. Breaux

[57] ABSTRACT

The invention relates to a combination valve and back pressure valve which in one embodiment performs as a two-way check valve, and in another embodiment performs as a back pressure valve. The invention contains both apparatus and method claims. The valve includes a cylindrical member having an inlet port and an outlet port, with a bore therethrough. A valve sleeve is disposed within the bore. A valve stem is also slidably disposed within the bore. A selective dis-attachment assembly is incorporated into the valve and includes pre-selected shear pistons.

16 Claims, 4 Drawing Sheets

COMBINATION CHECK VALVE & BACK PRESSURE VALVE

BACKGROUND OF THE INVENTION

This invention relates to valves installed in tubing strings. More particularly, but not by way of limitation, this invention relates to a combination two-way check valve and back pressure valve which in one embodiment performs as a two-way check valve, and in another embodiment performs as a back pressure valve.

A typical oil and gas well completion comprises a well bore that intersects a reservoir. A tubing string provides for a conduit so that the produced oil, gas and water may flow to the surface. Once at the surface, a series of surface valves (also known as the christmas tree) control the flow of the oil, water and gas.

During the life of the reservoir, the operator may deem it advisable to workover the well, which may require reworking the present zone, or alternatively, recompleting to another zone. In the course of workover operations, the christmas tree will be removed, and blow-out preventers will be joined to the tubing string via the tubing head and tubing hanger. In order to perform this operation, it is necessary to first install either a check valve or back pressure valve.

The check valve usually employed is well known to those of ordinary skill in the art. For instance, Cameron sells a "H" & "HM" Two-Way Check Valve. The valve is installed by using a lubricator, also well known in the art, such as the P-10 lubricator sold by Lubricators International. The advantage of using a check valve is that once in place, the blow-out preventer stack can be pressure tested for any leaks in the stack, manifold, etc. The two-way check valve can then be removed by the lubricator.

The typical back-pressure valve, which may be purchased from Cameron Iron Works, Inc. and known as the "H" Back Pressure Valve, may be used after the workover procedure. Thus, a back-pressure valve will be placed in the tubing hanger, the blow-out preventer stack will be disassembled, and the christmas tree will be put back in place. If pressure from the formation has built back up, fluid can be pumped through the back-pressure valve, and down the tubing string thereby creating a balanced hydrostatic head (also known as killing the well).

Prior art two-way check valves contain certain inherent deficiencies. For instance, when testing the Blow-Out Preventer's, if pressure has built up from the formation, it will be necessary to rig down the Blow-out Preventer's stack, re-install the christmas tree, remove the two-way check valve, locate in its place the traditional back pressure valve, and pump fluid down the tubing string in order to equalize the hydrostatic pressure i.e. kill the well.

Of course, it is not possible to first install the back pressure valve because of its inability to resist pressure from the top side, thereby precluding a testing of the Blow-Out Preventers. However, if the two way check valve is used, but is required to be replaced because of pressure build-up, such an operation is time consuming and very costly.

Therefore, it is an object of this invention to provide a combination two-way check valve that can be converted to a back-pressure valve by applying a pressure force to the two way check valve at the option of the operator. Another object of the invention is to combine the use of two separate tools into one which is more simple, and cost effective apparatus. Yet another object of the invention is to eliminate the procedure of changing out a two way check valve in order to locate a back pressure valve to equalize well pressure.

SUMMARY OF THE INVENTION

The invention contains apparatus claims for a combination two way check valve and back pressure valve. The present invention also contains a method of installing a combination two way check valve and back pressure valve in a blow out preventer stack, and retrieving same.

The valve contains a cylindrical body with a bore therethrough, with the body containing a sealing shoulder, and inlet and outlet ports. A pressure piston is attached to and disposed within the bore of the body, with the piston containing a bore therethrough. Selective dis-attachment means are provided for dis-attaching the pressure piston from the cylindrical body. Operating piston means, disposed within the bore of the pressure piston, are provided for blocking the flow in either an axial direction, with the operating piston means having defined thereon a sealing surface which cooperates with the sealing surface of the pressure piston.

Holding means for holding an operating piston in a first position with the cylindrical body so that the biasing means for biasing the operating piston acts against the sealing shoulder of the cylindrical body is provided. In one embodiment, the pressure piston contains a second sealing surface, and the operating piston contains a second sealing surface so that the second sealing surface of the pressure piston cooperates with the second sealing surface of the operating piston.

In the preferred embodiment, the holding means and the selective dis-attachment means are shear pins, which the particular type, size, hardness, etc, determines the amount of force necessary to shear the pressure piston from attachment with the body, and the operating piston from the body.

A method of installing a combination two way check valve and back pressure valve in a landing receptacle is also included during remedial and/or workover operations. Generally, a tubing string is situated in a well bore that penetrates an under ground formation. The tubing string will be attached to a series of control valves, such as known in the industry as a christmas tree.

The method will comprise the steps of placing in the landing receptacle the combination valve utilizing a lubricator, as is well known in the art. Next, the christmas tree is removed and dis-attached from the tubing string. Then, a set of blow out preventers is attached to the tubing string. At this point, the blow out preventers are pressure tested to ensure proper installation, i.e. that there are no leaks, by applying pressure to the top of the combination valve.

The pressure to the top of the combination valve is held constant to ensure a proper test. Following the test, pressure is again increased until the predetermined amount of force is obtained in order to shear the pins of the operating stem and the pressure piston thereby freeing the operating stem to be biased by the biasing means. Subsequent to the shearing of the pins, the combination valve is removed utilizing the lubricator device.

If the formation begins to build-up pressure subsequent to pressure testing the blow out preventers, pressure to the top of the valve is increased until the predetermined amount of force is reached so that the selective dis-attachment means is actuated. Then fluid is pumped through the combination valve and down the tubing string.

Continued pumping will equalize the hydrostatic pressure within the tubing string, i.e. killing the pressure from the formation. The combination valve is then removed from the tubing string utilizing the lubricator device, and the workover operations may continue.

A feature of the present invention includes the pressure piston which is responsive to an increase in pressure. Another feature includes the selective dis-attachment means which will dis-attach the pressure piston from the cylindrical body upon application of a predetermined amount of pressure.

Yet another feature is the operating stem which contains two sets of sealing surfaces for sealing engagement with the cylindrical body and the pressure piston thereby containing flow in an upward or downward axial flow through the valve body. Another feature includes use of the biasing means for biasing the operating stem to a closed position once the dis-attachment means has been activated thereby allowing axial flow in only one position.

An advantage of the present invention includes the use of one apparatus to perform the job of what traditionally has been performed by two devices. Another advantage is the amount of time which will be saved by the elimination of having to re-nipple up the christmas tree in case the formation unexpectedly builds up pressure.

Yet another advantage includes the ability to use traditional lubricator devices with the present invention to initially set, and then retrieve the device. Still another feature includes the use of either hydraulic fluid pressure or mechanical force to activate the selective dis-attachment means.

DESCRIPTION OF THE PREFERRED EMBODIMENTS

Figure 1A:
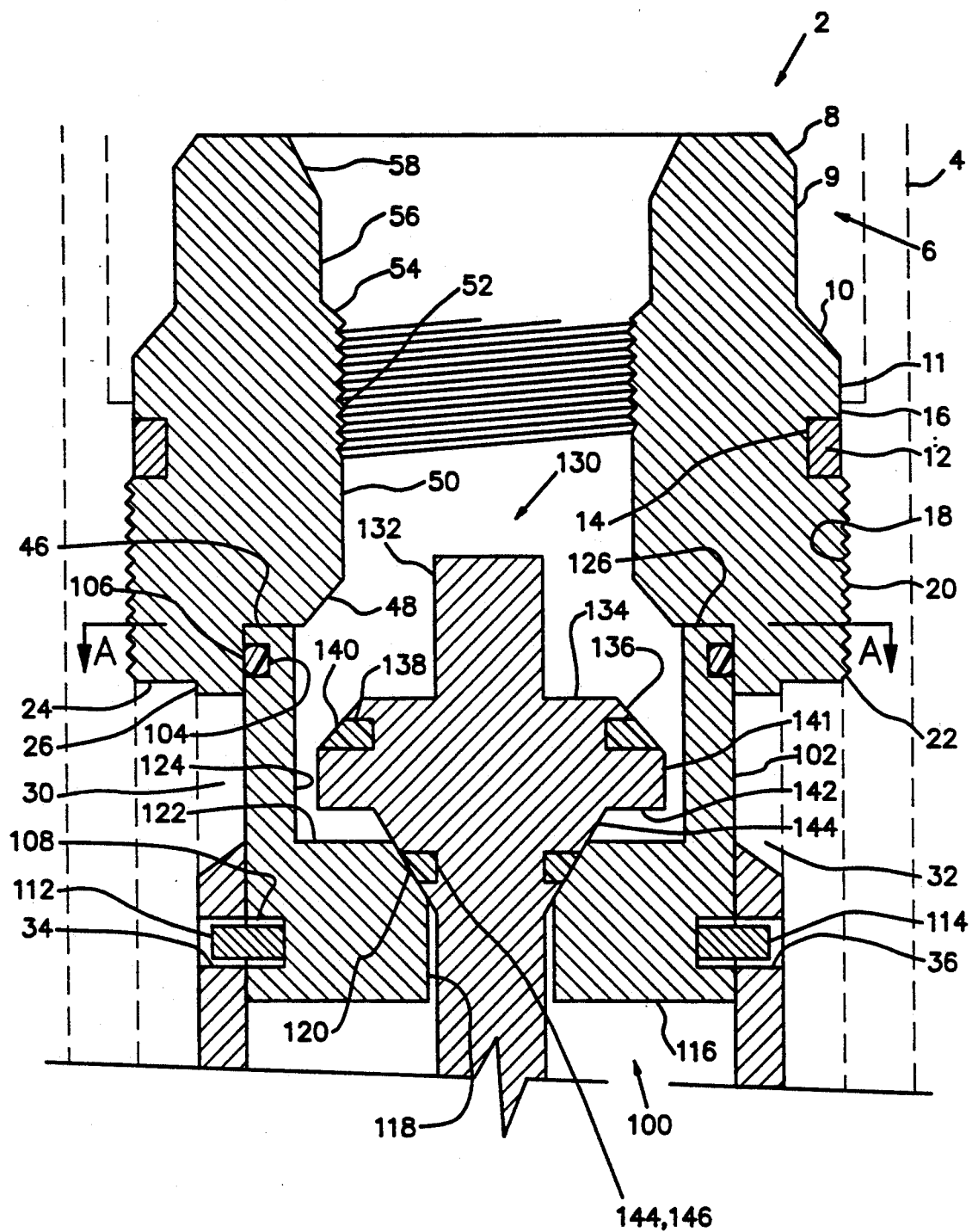
FIGS. 1A and 1B are sectional views of the combination valve while seated within the tubing hanger while the valve is acting as a check valve.

Referring to FIG. 1A, the sectional view of the present invention is depicted. In this position, the valve 2 is acting as a two way check valve. In other words, oil, gas and/or water will be precluded from migrating axially in either direction of the valve 2.

The valve 2 will be placed within a landing receptacle 4, which in the preferred embodiment is a tubing hanger. However, other suitable landing receptacle such as tubing hanger couplings, bushings or spools may be employed. As noted earlier, the valve is placed into the tubing hanger with the aid of a lubricator (not shown).

The valve 2 will generally comprise a cylindrical upper body 6, with the upper body including a first chamfered surface 8 which terminates at cylindrical first surface 9. Surface 9 extends to the second chamfered surface 10, which in turn extends to second cylindrical surface 11, with the surface 11 having disposed therein a recess 12 containing elastomeric seal means 14 which will engage with the sealing bore 16 of the tubing hanger.

The cylindrical surface 11 will also have contained thereon external thread means 18 which will threadedly mate with the internal thread means 20 of the tubing hanger. The thread means 18 will then terminate at chamfered surface 22, which will then extend to radial shoulder 24. The shoulder 24 stretches to the third cylindrical surface 26, which will terminate at the shoulder 28.

The surface 26 will have contained thereon outlet ports 30,32, a plurality of apertures 34,36, and inlet ports 38,40. Shear pins 35 will be placed in apertures 34, 36, and will be preselected according to the desired amount of force required to dis-attach the pressure piston 100 from the valve body 6.

Extending radially inward of shoulder 28 is internal thread means 42, which in turn extends to the internal bore 44, with the bore terminating at shoulder 46. The shoulder 46 will stretch to angled surface 48, and terminates at inner bore 50. The inner bore 50 has contained thereon internal thread means 52 which are utilized by the lubricator in setting and removal procedures. The thread means terminate at chamfered surface 54, which in turn extends to inner bore 56, then to angled surface 58.

Figure 1B:
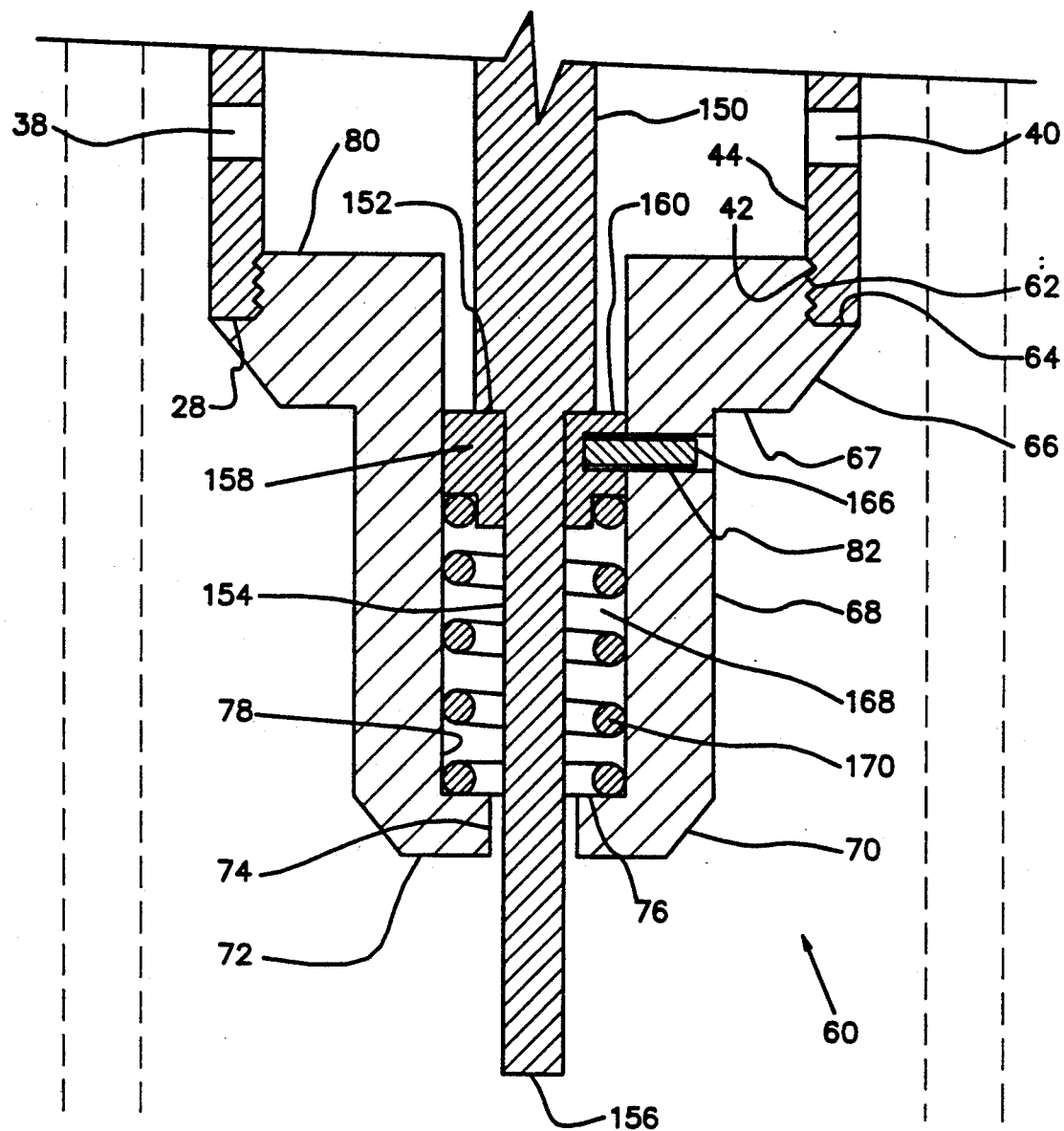

Referring to FIG. 1B, the lower valve body, seen generally at 60, includes external thread means 62 that terminate at radial shoulder 64, with tapered shoulder 66 stretching therefrom. Tapered shoulder 66 will extend to flat surface 67, and cylindrical surface 68, which in turn extends to tapered shoulder 70, with radially flat surface 72 extending therefrom.

Extending radially inward is inner bore 74, which extends to radially flat surface 76, which terminates at inner bore surface 78. Bore surface 78 extends to radial shoulder 80. Bore surface 78 will also contain at least one aperture 82.

Referring again to FIG. 1A, the pressure piston, also known as the valve sleeve, is seen generally at 100 which is responsive to a force such as fluid pressure. The pressure piston 100 will generally comprise a cylindrical outer surface 102 having disposed therein a recess 104 which will contain an elastomeric seal member, such as an o-ring, 106. The surface 102 also contains a circumferential groove 108 which will be aligned with apertures 34 and 36 by means of shear pins 35. The shear pins actually employed can be varied as to thickness, and hardness thereby directly effected the amount of force required to shear pins 35.

The surface 102 terminates at radial shoulder 116, which in turn terminates at inner bore surface 118, with surface 118 extending to sealing surface 120, which is a tapered surface, that extends to radially flat surface 122. Flat surface ends at second inner bore 124, with the inner bore concluding at surface 126.

The operating valve stem means for axially blocking the flow of oil, gas and/or water through the bore of the valve 2 is seen generally at 130. The valve stem will include a first cylindrical surface 132, which terminates at radially flat surface 134, which in turn leads to chamfered surface 136. The surface 136 will have contained thereon a recess 138 which will contain seal means 140. The angled surface 48 and the seal means 140 will cooperate with one another so that the seal means 140 sealingly engages the surface 48, as will be more fully explained in the operation of the preferred embodiment.

The surface 136 concludes at radially flat shoulder 142, which in turn leads to a second chamfered surface 144. The surface 144 will have a portion containing a recess 146, with an elastomeric seal means 148 contained therein. The angled surface 144 and the seal means 148 contained therein will cooperate with the sealing surface 120 so that the seal means 148 and sealing surface 120 sealingly engages one another, as will be more fully explained in the operation of the preferred embodiment.

The second chamfered surface 144 concludes at the second cylindrical surface 150, which is slidingly disposed within inner bore surface 118 and 78. The cylindrical surface 150 concludes at radial shoulder 152, which in turn leads to the third cylindrical surface 154, with the valve stem concluding at end 156.

The holding means seen at 158 comprises a top end 160 of which end 152 of the valve stem 130 will rest. The top end 160 extends to cylindrical surface 162 which will have contained therein circumferential groove 164 for placement of at least one shear pin 166. The holding means 158 and the inner bore 78 of the lower valve body form a spring chamber 168.

Figure 3:
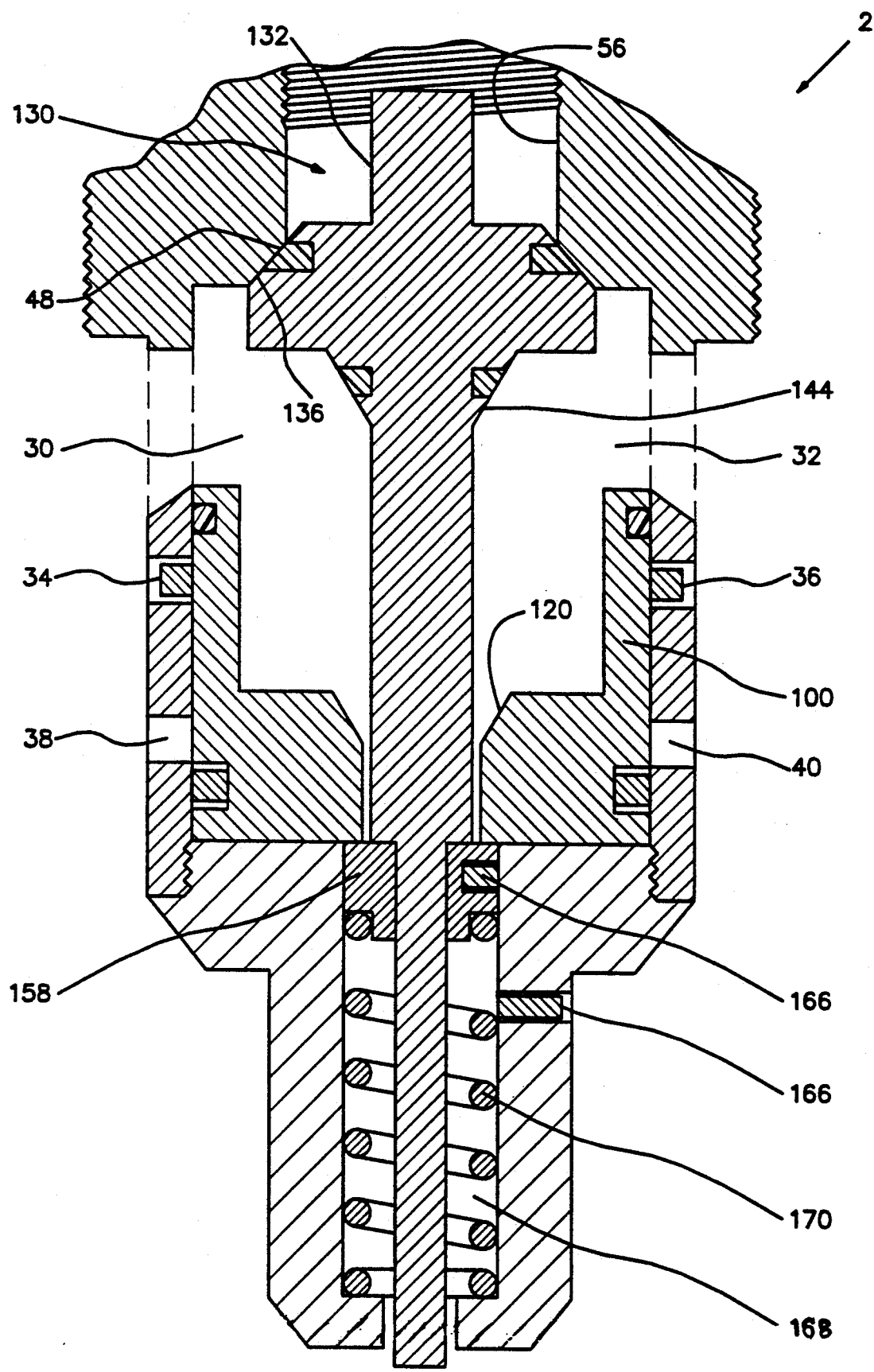
FIG. 3 is a sectional view of the combination valve seated within the tubing hanger while the valve is acting as a back pressure valve.

As seen in FIG. 3, biasing means 170, disposed within the spring chamber 168, are provided for biasing the operating valve stem 130 against the sealing surface 48 once the shear pin has been sheared and the holding means is released. In one embodiment, the biasing means is a conical spring which is held in compression by the holding means until pin 166 has been sheared. It should be noted that locking means for locking the pressure piston 100 in the down position, after shearing of the pins 35, can be employed (not shown). In other words, disposed within the axial bore of the cylindrical member for locking the valve sleeve in a down position after the predetermined force has been applied to shear the pins.

Figure 2:
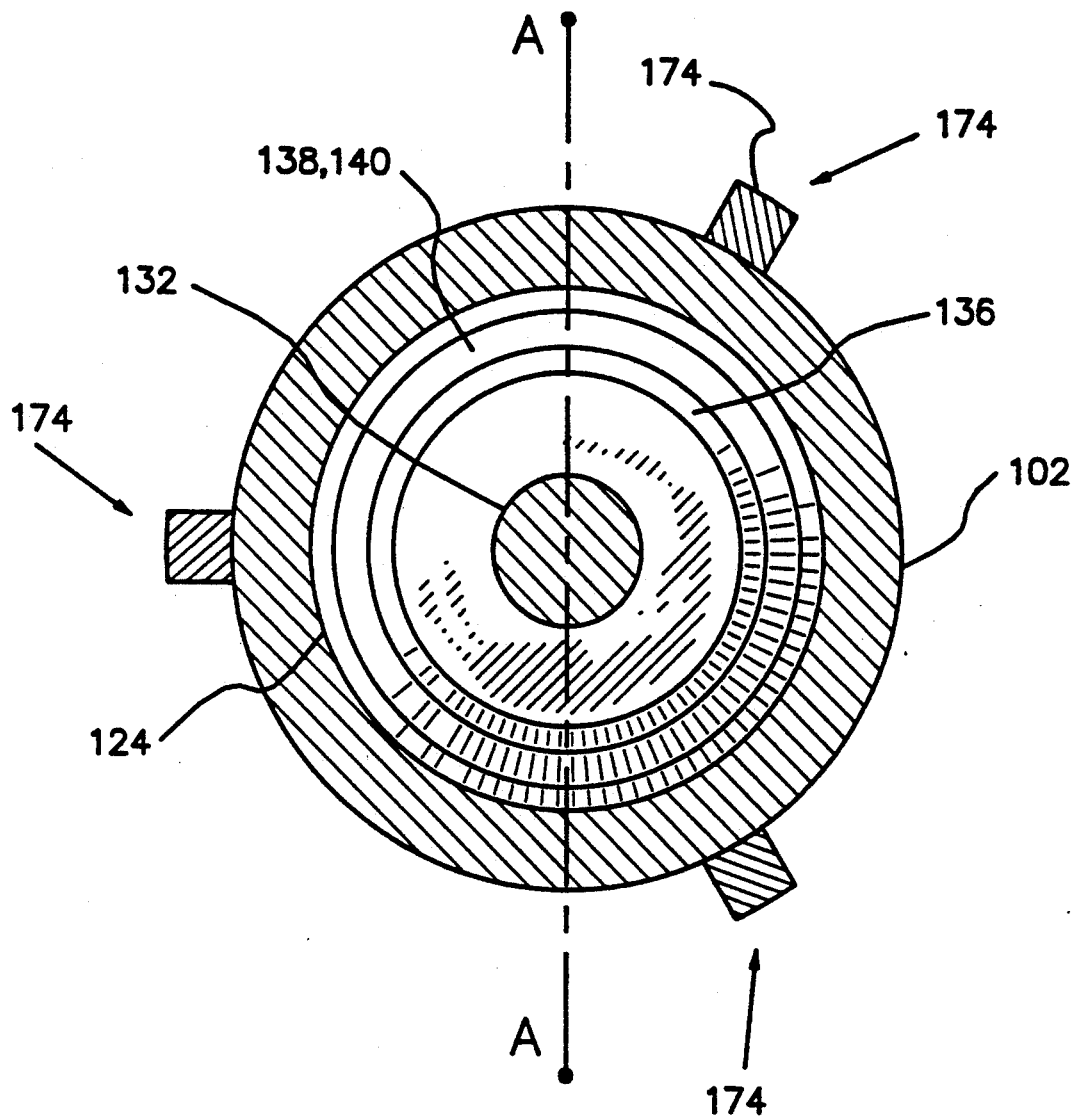
FIG. 2 is a cross-sectional view of the combination valve taken along line A—A of FIG. 1.

Referring to FIG. 2, which is a cross-section of the valve taken along line A—A of FIG. 1, the reinforcing means 174 is depicted. In the preferred embodiment of the invention, three separated reinforcing means traverse the cylindrical surface 26 in order to promote stability and provide support when the valve 2 is either being installed or removed within the landing receptacle 4. Please note that like numbers appearing in the different drawings correspond to previously described components of the other drawings.

OPERATION

As mentioned earlier, the valve 2 will be set within a landing receptacle 4, such as a tubing hanger, by means of a lubricator. Generally, the tubing string will have placed above a series of surface control valves, known as a christmas tree. In the position shown in FIG. 1, the combination valve is acting as a two way check valve.

If workover operations are to be performed, the christmas tree is removed, and in its place a stack of blow-out preventers is secured. In order to ensure that the blow-out preventers have been installed properly without defect, the blow out preventers are pressure tested.

Therefore, if pressure is increased above the valve, such as is the case when the operator is testing the blowout preventers, the valve stem 130 will be pushed axially downward so that the sealing surface 120, and the seal means 148 are engaged. This occurs because pressure acts on surface 134. Note, that the biasing means 170 is being held in compression by the holding means 158. The pressure is held constant until the operator deems that a satisfactory test is obtained.

If after the testing period, the pressure from the formation has increased so that pressure is being applied to the underside of the valve 2, the operating valve stem will travel axially upward in response thereto, with the seal means 140 sealingly engaging the angled surface 48. This occurs because the pressure acts through ports 38, 40, through bore 118, and against shoulder 142. Therefore, pressure will be precluded from migrating through the valve 2.

In the situation that pressure from the formation increases, the operator will deem it necessary to equalize the formation pressure by pumping a fluid down the tubing string. In order to accomplish this, a string of tubing will be screwed into the top of the tubing hanger. The pressure to the top of the valve is increased through the tubing, and at some point, the pressure will overcome the formation pressure, and will thus cause the valve stem 130 to unseat, and pressure will begin acting on the pressure piston 100 and surface 122. Once a predetermined amount of pressure has been reached (which in one embodiment is 3500 psi), the shear pins 35 will shear, as well as shear pin 166. It should be noted that mechanical means could be used to create a force on surface 132 in order to shear the pins, such as hydraulic rams, hydraulic/mechanical jacks or overweight devices.

The pressure piston will travel axially downward thereby exposing the ports 30 and 32. Thus, fluid can be pumped through the plug and into the tubing string via ports 30 and 32, and the formation pressure can be effectively equalized i.e. killing the well.

Once the pressure is equalized and pumping has ceased, the biasing means 170, having been no longer restrained by the holding means 158, will bias the valve stem 130 axially upward so that the seal means 140 will sealingly engage surface 48. At this point, the valve is in effect a back pressure valve. If pressure from the formation increases again, pumping action can resume. Thus, the pressure from the pump would force the valve stem off-seat, and fluid would travel through the inner bore 56, through ports 30 and 32, into the tubing string. Once the formation pressure has stabilized, the workover operations can continue.

If in the case wherein the formation pressure has not increased, i.e. remained stabilized, and the blow out preventers have been successfully tested, the pressure on the top side of the valve is increased to the predetermined amount so that the selective dis-attachment means 100 (also known as the pressure piston) is activated by shearing the pins 35. Thus, at this point, the valve will act as a traditional back pressure valve.

Next, the valve 2 can be removed by traditional lubricator means, and the workover can continue. It should be noted that while the use of this valve 2 has been described in the context of a workover operations, other uses of the combination valve are certainly possible, such as pressure safety relief valves, vacuum check/relief valves or combination pressure/vacuum relief valves.

Changes and modifications in the specifically described embodiments can be carried out without departing from the scope of the invention which is intended to be limited only by the scope of the appended claims.

I claim:

1. A valve, comprising:
   a cylindrical body with a bore therethrough, said body containing a sealing shoulder, and a portion defining a first and second port;
   a pressure piston, disposed within said bore of said cylindrical body, said pressure piston containing a central passageway therethrough and a sealing surface;
   first holding means for holding said pressure piston in a first position relative to said cylindrical body;
   operating stem means, disposed within said bore of said pressure piston, for blocking flow in either axial direction, said operating piston means having a sealing surface which cooperates with the sealing surface of said pressure piston.

2. The valve of claim 1, further comprising:
   biasing means, disposed about said operating piston means, for biasing said operating piston means against the sealing shoulder of said cylindrical body;
   compression means, disposed about said operating piston means and abutting said biasing means, for holding said biasing means in compression;
   and wherein said pressure piston contains a second sealing surface, and wherein said operating piston contains a second sealing surface so that the second sealing surface of said pressure piston cooperates with the second sealing surface of said operating piston.

3. The valve of claim 2, wherein said cylindrical body has contained thereon an aperture, said pressure piston has contained thereon a groove, and wherein said first holding means comprises a shear pin fitter within said apertures.

4. The valve of claim 3, wherein said cylindrical body further contains a second aperture and wherein said compression means includes:
   a shear piston, disposed about said operating piston, containing a groove thereon;
   a shear pin fitter through the second of said cylindrical body and shear piston, and wherein said biasing means includes a spring disposed about said operating piston, and urging said shear piston axially upward; and wherein said shear pins are preselected to shear after a predetermined amount of force has been applied.

5. The valve of claim 4, wherein said shear pins are preselected to shear at a pressure of 3500 psi.

6. The valve of claim 4, further comprising:
   lock means, disposed within said bore of said cylindrical body, for locking said pressure piston in a down position after the predetermined amount of force has been applied to shear said pins.

7. An apparatus to control the flow in a well bore comprising:
   a cylindrical member having an inlet port and an outlet port, said cylindrical member having an axial bore therethrough with a sealing bore thereon;
   a valve sleeve, slidably disposed within said axial bore of said cylindrical member and attached thereto, said valve sleeve having an inner diameter therethrough, and a sealing shoulder thereon;
   selective dis-attachment means for attaching said cylindrical member to said valve sleeve;
   a valve stem, slidably disposed within said axial bore of said valve sleeve, said valve stem containing a first and second shoulder, with the first shoulder cooperating with the sealing bore of said cylindrical member, and the second shoulder cooperating with the sealing bore of said valve sleeve.

8. The apparatus of claim 7, further comprising:
   biasing means, disposed about said valve stem, for biasing said valve stem in a closed position;
   holding means, operably connected to said cylindrical member and said valve stem, for holding the biasing means in compression.

9. The apparatus of claim 8, wherein said cylindrical member contains an aperture therein, and said valve sleeve also contains an aperture; and,
   wherein said selective dis-attachment means comprises a shear pin positioned within said apertures of said cylindrical member and valve sleeve.

10. The apparatus of claim 9, wherein said biasing means includes a spring disposed about said valve stem, and tending to bias said valve stem in an axial upward direction.

11. The apparatus of claim 10, wherein said cylindrical member contains a second aperture, and wherein said holding means includes a shear piston having a circumferential groove, and a shear pin placed within said second aperture of said cylindrical member and said groove of said shear piston so that said shear piston holds said spring in compression; said shear pins being selected to shear at a predetermined amount of pressure applied to the apparatus.

12. The apparatus of claim 11, further comprising reinforcement means, located about the periphery of the valve, for adding reinforcement structure to the valve during installation and removal operations.

13. The apparatus of claim 11, further comprising:
   lock means, disposed within said axial bore of said cylindrical member, for said valve sleeve in a down position after the predetermined amount of force has been applied to the apparatus to shear said pins.

14. A method of installing a combination two-way check valve and back pressure valve in a receptacle located in a tubing string penetrating an underground formation during remedial workover operations, the tubing string having attached thereto a surface control valve, the method comprising the steps of:
   a. placing in the landing receptacle the combination valve utilizing a lubricator connected to the surface control valve, said combination valve comprising: a cylindrical body; a pressure piston; first and second selective dis-attachment means responsive to a pressure force; operating piston means; biasing means for biasing said operating piston in a closed position;
   b. removing the surface control valve;
   c. installing a stack of blow-out preventers, the blow-out preventers being connected to the tubing string;
   d. pressure testing the blow-out preventers for proper installation by applying pressure to the top of said combination valve.

15. The method of claim 11, wherein pressure from the formation builds in the tubing string, and further comprising the steps of:
   e. creating a pressure to the top of the combination valve until a predetermined amount of pressure has been reached so that the selective dis-attachment means is actuated;
   f. pumping a fluid through the combination valve and down the tubing string to create a hydrostatic head of fluid;

g. equalizing the pressure from the formation by the hydrostatic head of fluid in the tubing string;
h. removing the combination valve from the landing receptacle;
i. continuing the remedial workover operations.

16. The method of claim 11, further comprising the steps of:
e. creating a pressure to the top of the plug until a predetermined amount of pressure has been reached so that the selective dis-attachment means is actuated;
f. removing the combination valve from the landing receptacle utilizing the lubricator;
g. continuing the remedial workover operations.

* * * * *